United States Patent [19]

Bernstein

[11] Patent Number: 4,525,908
[45] Date of Patent: Jul. 2, 1985

[54] MANUALLY OPERABLE UNIVERSAL KEY CODE CUTTING DEVICE

[75] Inventor: Victor H. Bernstein, Oxnard, Calif.

[73] Assignee: Tri County Tool Inc., Ventura, Calif.; a part interest

[21] Appl. No.: 524,415

[22] Filed: Aug. 18, 1983

[51] Int. Cl.³ .............................................. B23D 69/02
[52] U.S. Cl. .................................................. 29/76 C
[58] Field of Search ........................ 29/76 C; 76/110; 409/81, 82, 83

[56] References Cited

U.S. PATENT DOCUMENTS 2,671,946 3/1954 Starrett ............................... 29/76 C Primary Examiner—William R. Briggs
Attorney, Agent, or Firm—Ralph B. Pastoriza

[57] ABSTRACT

The device includes a base plate, a longitudinally slidable key vise carriage on the base plate, and an overhead support for a manually operable key file. The various components cooperate in such a manner as to permit adjustments in the successive spacing between cuts, angles of the cuts relative to the longitudinal axis of the key as viewed in plan, depth of the cuts and slope of the floor of the cuts, the latter adjustment being effected by securing the key in the key vise in various rotative positions.

5 Claims, 5 Drawing Figures

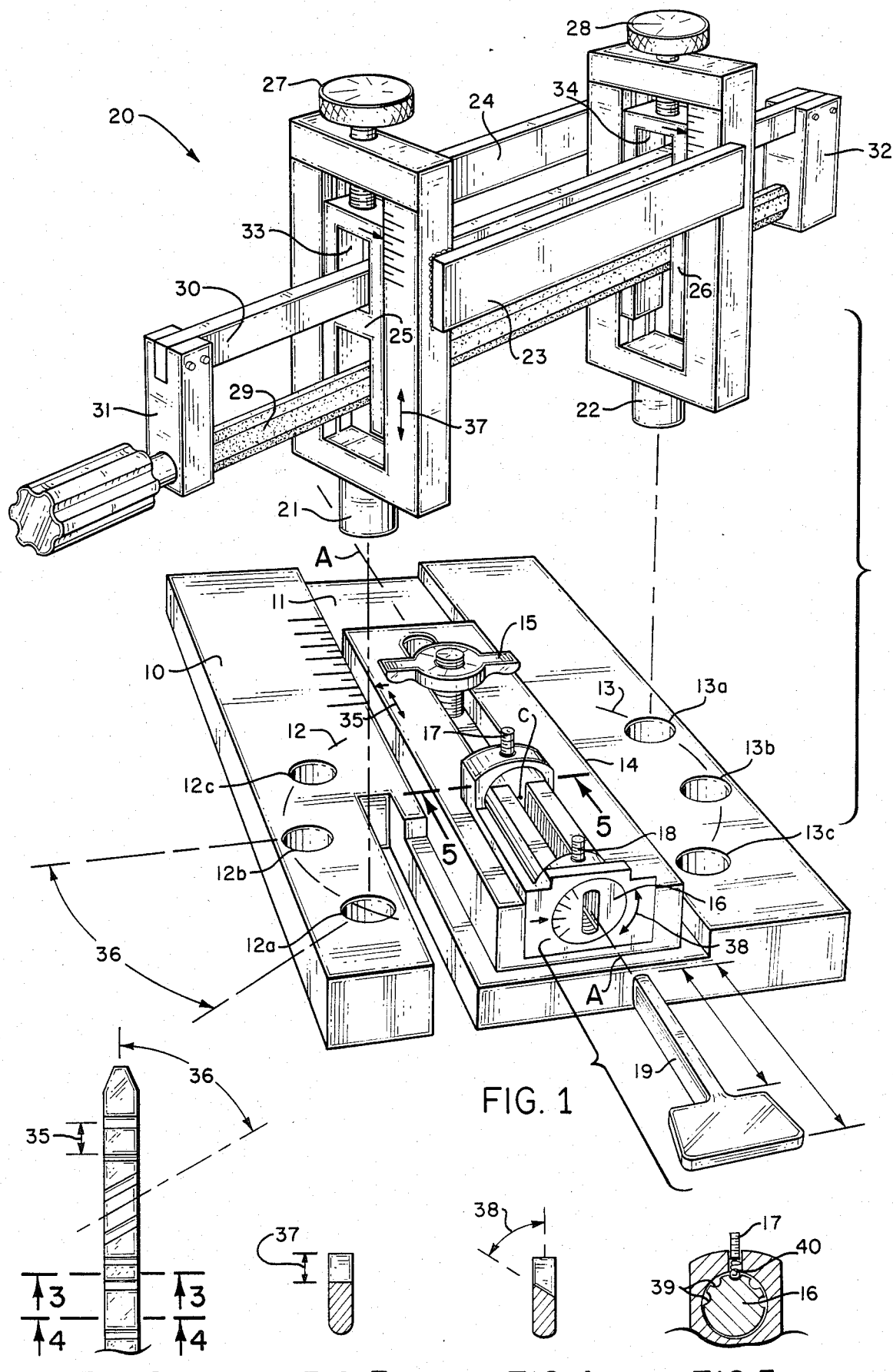

MANUALLY OPERABLE UNIVERSAL KEY CODE CUTTING DEVICE

FIELD OF THE INVENTION

This invention relates generally to keys and more particularly to an improved manually operable universal cutting device for cutting keys in accord with a given key code.

BACKGROUND OF THE INVENTION

Most key cutters as used by locksmiths comprise a pair of vises, one for holding a key to be duplicated and the other for holding a key blank. The key to be duplicated serves as a "template" for a guide which moves in and out of the key indentations as the pair of vises are moved in the longitudinal direction of the key. This key guide controls the movement of the vise holding the key blank against a power driven rotating file so that corresponding indentations are cut in the key blank. With these types of cutters, it is generally only possible to control the spacing between successive cuts and the depth of the particular cuts.

In addition to conventional type keys which can be formed on the above-described equipment, there are more sophisticated keys wherein the various indentations may be formed at angles to the longitudinal axis of the key when the key is viewed in plan and also wherein the floor of the cut might be provided with a slope when viewing the floor of the cut along the longitudinal axis of the key. These keys are used where high security is necessary and cannot be duplicated with equipment of the type described heretofore normally found in a locksmith's shop. However, there is available on the market very sophisticated automatic key cutting equipment which will enable the duplication of the more sophisticated types of keys wherein the angle of the cuts and the slope of the floor of the cuts constitute part of the key "combination". These specific machines are relatively complicated and quite expensive, normally out of reach of a conventional locksmith.

BRIEF DESCRIPTION OF THE PRESENT INVENTION

With the foregoing considerations in mind, the present invention contemplates a manually operable universal key code cutting device which will enable the cutting from key blanks of sophisticated keys wherein adjustments can be made not only for the spacing of successive cuts and their depths, but also for the angle of the cut with respect to the longitudinal axis of the key when viewed in plan as well as the slope of the floor of the cut when viewing the key along the longitudinal axis of the key. Essentially, a blank key is cut in accord with a code which defines the spacing of the cuts, the depths of the cuts, the angle of the cut relative to the longitudinal axis of the key and the slope of the floor of the cut. The overall design is such that the same can be manufactured relatively economically and thus made generally available to locksmiths.

In its broadest aspect, the device includes a base plate. A key vise carriage plate is mounted for longitudinal movement along the base plate. A supporting means extends upwardly from the base plate and includes a key file guide vertically movable in the supporting means. The supporting means itself can be positioned at various angles on the base plate so that the angle of movement of a file in the file guide can be adjusted. Further, the key vise carriage plate serves to support a cylindrical key holder which can rotate in the key vise carriage plate so that the rotative position of the key can be adjusted.

With the foregoing components, the longitudinal spacing between successive cuts can be adjusted by movement of the key vise carriage plate relative to the base plate, the angle of the cut adjusted by proper positioning of the overhead supporting means for the key file, the depth of cut adjusted by the vertical position of the key file guide in the supporting means, and the slope of the floor of the cut adjusted by the rotative position of the key in the key vise.

BRIEF DESCRIPTION OF THE DRAWINGS

A better understanding of this invention will be had by referring to a preferred embodiment thereof as illustrated in the accompanying drawings in which:

FIG. 1 is an exploded perspective view of the basic components of the manually operable universal key code cutting device of this invention;

FIG. 2 is a fragmentary top plan view of a key shaft after the same has been cut with the key cutter of FIG. 1;

FIG. 3 is a cross section of the key taken in the direction of the arrows 3—3 of FIG. 2;

FIG. 4 is a cross section of the key taken in the direction of the arrows 4—4 of FIG. 2; and FIG. 5 is a fragmentary cross section taken in the direction of the arrows 5—5 of FIG. 1.

DETAILED DESCRIPTION OF THE PREFERRED EMBODIMENT

Referring to FIG. 1, the key cutter includes a base plate 10 having a central rectilinear longitudinal guide channel 11 formed therein. The base plate also includes a series of support openings lying on circumferential portions 12 and 13 of a circle on diametrically opposite sides of the channel 11, the center of the circle indicated at C lying on the longitudinal axis A—A of the channel. The support openings themselves are circular in cross section and indicated at 12a, 12b and 12c with corresponding openings forming diametrically opposite pairs at 13a, 13b, and 13c.

A key vise carriage 14 is shown longitudinally slidable in the channel 11. The position of this carriage in the channel 11; that is, relative to the base plate 10 can be secured as by a wing nut 15 which will clamp the adjusted position of the carriage 14 in the channel 11.

The key vise carriage 14 serves to support a cylindrical key holder 16 the rotative position of which can be set and held as shown by an appropriate set screw 17 at the far end of the cylinder as viewed in FIG. 1. A key, in turn, is held within the key holder 16 as by a further set screw 18 shown at the near end of the cylinder. A blank 19, shown exploded away from the cylinder 16, is used for initial calibration of the cutter.

Referring to the upper portion of FIG. 1, there is shown an overhead supporting means designated generally by the numeral 20 and including legs 21 and 22 which can be received in a selected pair of said support openings diametrically opposite to each other. For example, in the angulated position for the overhead support means 20 as illustrated in FIG. 1, the legs 21 and 22 would be received in the diametrically opposite openings 12a and 13a. The legs 21 and 22 have cross sections corresponding to those of the openings so as to fit snugly in the openings and hold the overhead structure stationary relative to the base plate 10. The legs 21 and 22 are secured relative to each other by appropriate side plates 23 and 24 welded to the sides of the legs as indicated.

Each of the legs 21 and 22 includes a key file guide vertically mounted in the legs as indicated at 25 and 26 respectively. These key file guides comprise members keyed for up and down movement along the leg. The position of the key file guides 25 and 26 can be carefully adjusted by lead screws 27 and 28 respectively.

A key file 29 as shown in the overhead support means 20 includes a file guide beam 30 connected at each end as at 31 and 32 to the file 29 above the file in parallel relationship thereto. This file guide beam 30 extends through central openings 33 and 34 in the form of windows in the key file guide members 25 and 26. The file guide beam 30 thus rides on the floor of the openings 33 and 34. As a consequence, the level of the file 29 relative to the base plate 10 when the legs 21 and 22 are received in support openings on the base plate is determined by the level of the file guides 25 and 26 which in turn is determined by the adjustments of the lead screws 27 and 28. It will be appreciated that these latter adjustments will control the depth of cuts made by the file 29. In other words, the openings 33 and 34 in the guide members 25 and 26 are sufficiently elongated in a vertical direction as to permit the file 29 when engaging a key blank to raise up along with the guide beam 30. The depth of cut can be no greater than that effected by the file 29 when the guide beam 30 is limited in its downward extent by the bottom of the openings 33 and 34 in the guide members 25 and 26.

From all of the foregoing, the various adjustments of cuts in a key blank with the device of this invention will become evident.

First, the longitudinal spacing between successive cuts is effected as indicated by the double headed arrow 35 in FIG. 1 indicating that the longitudinal position of the key vise carriage 14 can be manually changed with respect to the base plate 10. In other words, after a key is positioned in the key vise 16, the carriage 14 is adjusted relative to the overhead file 29 so as to effect a first cut closest to the head of the key. The carriage 14 can then successively be moved rearwardly as viewed in FIG. 1, that is, towards the viewer in accord with the spacing code as determined by an appropriate scale on the base plate 10.

The angle of each cut relative to the longitudinal axis A—A when viewed in plan, in turn, is controlled by the selected pair of openings for supporting the legs 21 and 22. Thus, if all cuts are to be made transverse to the longitudinal axis of the key as is often the case with conventional keys, then the legs 21 and 22 will be received in the corresponding openings 12b and 13b in the base plate 10. If the cuts are to be made at an angle, then the overhead support means can be removed and repositioned so that the legs will be received in either one of the other pairs 12a, 13a, or 12c, 13c. The angulated cut is indicated by the double headed arrow 36 shown to the left of the base plate 10 in FIG. 1.

As already described, the depth of each cut is controlled by the position of the file guide members 25 and 26 which is controlled by the lead screws 27 and 28. This positioning is indicated by the double headed arrow 37 adjacent to a side of the leg 21 in FIG. 1.

Finally, the slope of the floor of each cut can be adjusted by the rotative position of the cylindrical key holder 16 in the key vise carriage 14. This positioning is indicated by the double headed arrow 38 in FIG. 1.

Examples of the longitudinal positioning, angulation, depth and slope of the floor of the various cuts are illustrated in FIGS. 2, 3 and 4 on a key shaft.

Referring first to FIG. 2, the spacing between the cuts is indicated by the double headed arrow 35 while the angle of a cut is illustrated by the double headed arrow 36.

In FIG. 3, the depth of a cut is indicated by the double headed arrow 37 while the slope of the floor of the cut is indicated in FIG. 4 by the double headed arrow 38.

The cross section of FIG. 5 shows one means for adjusting the rotative position of the cylindrical key holder 16 described in FIG. 1. As shown, there are provided a series of detents 39 for receiving a spring biased ball 40 engaged by the set screw 17 in FIG. 1 depending upon the rotative position of the cylinder 16.

From all of the foregoing, it will now be evident that the present invention has provided a very simple and economical key code cutting device. Once a particular code is given, a blank key can be cut in accord with the code by effecting the various adjustments as defined by the code.

It will be appreciated that the key cutter described can be used for conventional keys as well as sophisticated high security keys wherein angulated cuts and sloping floor cuts are used. Further, dial type read-out micrometers instead of scales can be used to indicate the relative positions of the components such as the carriege 14 and the key file guides 25 and 26 in the overhead structure.

Such modifications falling within the scope and spirit of this invention will occur to those skilled in the art. The manually operable universal key code cutting device is therefore not to be thought of as limited to the specific embodiment set forth for illustrative purposes.

I claim:

1. A manually operable universal key cutting device including, in combination:
   (a) a base plate;
   (b) longitudinally extending means on said base plate;
   (c) a key vise carriage plate mounted on said longitudinally extending means for longitudinal movement along said base plate;
   (d) a supporting means extending upwardly from said base plate; and
   (e) a key file guide vertically movable in said supporting means whereby when a file is received in said key file guide and a blank key held in said key vise carriage plate, the spacing of successive cuts on the key blank by said file can be adjusted by adjusting the longitudinal position of the carriage plate on the base plate and the depth of cut can be adjusted by adjusting the vertical position of said file guide in said supporting means.

2. A device according to claim 1, including means for adjusting the angle of said file guide relative to the longitudinal direction of the key blank as viewed in plan so that angulated cuts can be made.

3. A device according to claim 1, in which said key vise carriage includes means for adjusting the rotative position of a key held therein so that the slope of the floor of a cut can be adjusted.

4. A manually operable universal key code cutting device, including, in combination:

(a) a base plate having a central rectilinear longitudinal guide channel and a series of support openings lying on circumferential portions of a circle on diametrically opposite sides of said channel, the center of the circle lying on the longitudinal axis of said channel;

(b) a key vise carriage longitudinally slidable in said channel;

(c) a cylindrical key holder for a blank key to be cut rotatably receivable in said key vise carriage;

(d) an overhead supporting means having legs received in a selected pair of said support openings diametrically opposite to each other; and (e) a key file guide vertically movable in said supporting means whereby when a file is received in said key file guide and a blank key is received in said cylindrical key holder, said file can be manually moved back and forth over the key blank to make a cut, the longitudinal position of the cut being adjusted by sliding said key vise carriage in said base plate, the angle of the cut being adjusted by the selected support openings for said supporting means: the depth of said cut being adjusted by the vertical position of said key file guide in said supporting means; and the slope of the cut being adjustable by adjusting the rotative position of said cylindrical key holder in said key vise carriage.

5. A device according to claim 4, in which said support openings are circular in cross section, the legs of said overhead supporting means having corresponding cross sections for reception in corresponding openings, said file having a file guide beam connected at each end to the file and spaced above the file in parallel relationship to the file, each key file guide comprising a vertically slidable member keyed for up and down movement along said leg, said member having a central opening receiving said guide beam so that the level of the file is controlled by the position of said vertically slidable member; and a lead screw means for vertically positioning said vertical slide member.

* * * * *